(12) United States Patent
Kuriyagawa

(10) Patent No.: US 11,363,756 B2
(45) Date of Patent: Jun. 21, 2022

(54) WORK MACHINE FOR LESSENING DAMAGE RESULTING FROM AN OBJECT COMING INTO CONTACT WITH WORK PORTION

(71) Applicant: HONDA MOTOR CO., LTD., Tokyo (JP)

(72) Inventor: Koji Kuriyagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/009,251

(22) Filed: Sep. 1, 2020

(65) Prior Publication Data
US 2020/0390028 A1 Dec. 17, 2020

Related U.S. Application Data

(63) Continuation of application No. PCT/JP2018/009278, filed on Mar. 9, 2018.

(51) Int. Cl.
*A01D 34/00* (2006.01)
*A01B 71/02* (2006.01)
(Continued)

(52) U.S. Cl.
CPC ............ *A01D 34/006* (2013.01); *A01B 71/02* (2013.01); *A01D 34/54* (2013.01); *A01D 34/76* (2013.01);
(Continued)

(58) Field of Classification Search
CPC .. F02B 77/08; F02D 11/107; F02D 2200/101; F02D 2200/501; F02D 2400/06;
(Continued)

(56) References Cited

U.S. PATENT DOCUMENTS 5,325,650 A * 7/1994 Fuse ................... A01D 43/0631
56/10.2 R
6,247,296 B1 * 6/2001 Becker ................. A01D 41/142
460/20
(Continued)

FOREIGN PATENT DOCUMENTS

EP 3014975 A1 * 5/2016 ........... A01D 75/182
EP 3014975 A1 5/2016
(Continued)

OTHER PUBLICATIONS

Extended European Search Report for European Patent Application No. 18908814.9 dated Feb. 1, 2021.
(Continued)

*Primary Examiner* — John M Zaleskas
(74) *Attorney, Agent, or Firm* — Thomas | Horstemeyer, LLP

(57) ABSTRACT

A work machine determines, when a request to restart an engine is made, whether or not a reason indicated by stop information stored in a memory is a reason related to locking of the work portion. The machine sets an operation mode of the engine and a work portion to a safe mode if it determines that the reason indicated by the stop information is a reason related to locking of the work portion. The safe mode is an operation mode for lessening damage resulting from causing the engine and the work portion to work during the work portion locked or damage resulting from an object coming into contact with the work portion during the engine and the work portion working.

14 Claims, 8 Drawing Sheets

(51) Int. Cl.

| | | |
|---|---|---|
| *A01D 34/54* | (2006.01) | |
| *A01D 69/02* | (2006.01) | |
| *A01D 69/08* | (2006.01) | |
| *F02B 77/08* | (2006.01) | |
| *F02D 11/10* | (2006.01) | |
| *F02D 33/00* | (2006.01) | |
| *F02D 37/02* | (2006.01) | |
| *A01D 75/18* | (2006.01) | |
| *A01D 34/82* | (2006.01) | |
| *F02N 11/10* | (2006.01) | |
| *F02N 11/08* | (2006.01) | |
| *A01D 34/76* | (2006.01) | |
| *A01D 101/00* | (2006.01) | |
| *F02N 11/04* | (2006.01) | |
| *A01D 34/68* | (2006.01) | |

(52) U.S. Cl.
CPC ......... *A01D 34/828* (2013.01); *A01D 69/025* (2013.01); *A01D 69/08* (2013.01); *A01D 75/185* (2013.01); *F02B 77/08* (2013.01); *F02D 11/107* (2013.01); *F02D 33/006* (2013.01); *F02D 37/02* (2013.01); *F02N 11/0837* (2013.01); *F02N 11/106* (2013.01); *A01D 34/6818* (2013.01); *A01D 2101/00* (2013.01); *F02D 2200/101* (2013.01); *F02D 2200/501* (2013.01); *F02N 11/04* (2013.01); *F02N 11/0866* (2013.01); *F02N 2200/043* (2013.01); *F02N 2200/12* (2013.01); *F02N 2300/2002* (2013.01); *F02N 2300/2011* (2013.01)

(58) Field of Classification Search
CPC ... F02D 33/006; F02D 37/02; A01D 2101/00; A01D 34/006; A01D 34/54; A01D 34/6818; A01D 34/76; A01D 34/78; A01D 69/025; A01D 69/08; A01D 75/18; A01D 75/182; A01D 75/185; A01D 75/187; A01B 71/02
See application file for complete search history.

(56) References Cited

U.S. PATENT DOCUMENTS

| | | | |
|---|---|---|---|
| 7,015,662 B2 | 3/2006 | Wakitani et al. | |
| 7,797,915 B1* | 9/2010 | Kallara | A01D 34/62 56/10.2 R |
| 9,263,975 B2 | 2/2016 | Wang et al. | |
| 9,825,559 B2 | 11/2017 | Wang et al. | |
| 10,041,421 B2 | 8/2018 | Gruell et al. | |
| 10,219,437 B2 | 3/2019 | Kuriyagawa et al. | |
| 10,718,277 B2 | 7/2020 | Gruell et al. | |
| 2004/0169481 A1 | 9/2004 | Wakitani et al. | |
| 2007/0275821 A1* | 11/2007 | Kawakami | A01D 34/6812 477/107 |
| 2008/0110148 A1* | 5/2008 | Itoh | A01D 34/90 56/10.3 |
| 2009/0277743 A1* | 11/2009 | Park | A01D 34/828 192/84.1 |
| 2010/0005768 A1* | 1/2010 | Silbernagel | A01D 69/08 56/10.2 R |
| 2010/0294097 A1* | 11/2010 | Aoki | A01D 34/828 83/58 |
| 2010/0294098 A1* | 11/2010 | Nakadate | A01D 75/20 83/62.1 |
| 2010/0294616 A1* | 11/2010 | Osawa | A01D 34/828 192/129 R |
| 2012/0227368 A1* | 9/2012 | Koike | B60K 7/0007 56/10.2 A |
| 2012/0227369 A1* | 9/2012 | Koike | B60W 30/1886 56/10.2 A |
| 2014/0062352 A1* | 3/2014 | Wang | H02P 5/68 318/139 |
| 2014/0250849 A1* | 9/2014 | Ritter | A01D 75/182 56/10.2 R |
| 2015/0225027 A1* | 8/2015 | Ertel | A01D 42/00 180/53.7 |
| 2015/0289444 A1* | 10/2015 | Koike | A01D 34/78 701/50 |
| 2016/0020714 A1* | 1/2016 | Wang | A01D 34/78 318/139 |
| 2016/0113209 A1* | 4/2016 | Sergyeyenko | A01G 3/053 30/216 |
| 2016/0252024 A1* | 9/2016 | Gruell | F02D 37/02 123/333 |
| 2016/0295797 A1* | 10/2016 | Ito | A01D 34/008 |
| 2017/0265381 A1* | 9/2017 | Kuriyagawa | F02D 17/02 |
| 2017/0265382 A1* | 9/2017 | Kuriyagawa | A01D 34/64 |
| 2017/0265395 A1 | 9/2017 | Kuriyagawa et al. | |
| 2018/0092297 A1* | 4/2018 | Sunazuka | G01P 15/18 |
| 2018/0146616 A1* | 5/2018 | Fukano | B60L 50/52 |
| 2018/0310471 A1* | 11/2018 | Pellenc | A01D 34/74 |
| 2018/0347478 A1* | 12/2018 | Gruell | F02D 17/04 |
| 2019/0111789 A1* | 4/2019 | Matsuda | A01D 69/02 |
| 2019/0200521 A1* | 7/2019 | Aboumrad | A01D 34/006 |
| 2019/0357429 A1* | 11/2019 | Andre | F02D 28/00 |
| 2020/0375091 A1* | 12/2020 | Kuriyagawa | E01H 5/045 |
| 2020/0378455 A1* | 12/2020 | Kuriyagawa | A01D 34/006 |

FOREIGN PATENT DOCUMENTS

| | | | |
|---|---|---|---|
| JP | 01291716 A * | 11/1989 | ......... A01D 75/182 |
| JP | H02145117 A | 6/1990 | |
| JP | H10-011142 A | 1/1998 | |
| JP | 2004266933 A | 9/2004 | |
| JP | 4566017 B2 | 10/2010 | |
| JP | 2016220604 A | 12/2016 | |
| JP | 2017166452 A | 9/2017 | |
| WO | 2017/109319 A1 | 6/2017 | |
| WO | 2019171589 A1 | 9/2019 | |

OTHER PUBLICATIONS

International Search Report for PCT/JP2018/009278 dated Jun. 5, 2018.

* cited by examiner

WORK MACHINE FOR LESSENING DAMAGE RESULTING FROM AN OBJECT COMING INTO CONTACT WITH WORK PORTION

CROSS-REFERENCE TO RELATED APPLICATION(S)

This application is a continuation of International Patent Application No. PCT/JP2018/009278 filed on Mar. 9, 2018, the entire disclosures of which is incorporated herein by reference.

TECHNICAL FIELD

The present invention relates to a work machine that is driven by an engine.

BACKGROUND

Patent Document 1 describes an engine-driven work machine with a generator that can be used as a motor. More specifically, it is stated that the generator is driven to generate electric power by an engine in accordance with the amount of change in the opening of a throttle, and electric power is supplied from a battery to the generator to cause the generate to function as a motor and assist the engine with the motor.

CITATION LIST

Patent Literature

Patent Document 1: Japanese Patent Laid-Open No. 2004-266933

SUMMARY

If a large load is abruptly applied to the work machine, a work portion and an engine may stop. For example, if a foreign object such as a rock comes into contact with a blade of a mower, the blade of the lawn mower may stop or may be likely to stop. This phenomenon is called blade locking. If an abrupt load is applied to the work portion in any kind of work machine such as a snow blower or a cultivator, the work portion and the engine will stop. If the engine that has stopped due to the work portion having been locked is restarted, the work portion and engine parts may be damaged.

For example, the present invention provides a work machine including: an engine; a work portion driven by the engine; and a control portion for controlling the engine, the control portion including: a storing portion configured to store, when the engine has stopped, stop information indicating a reason that the engine has stopped; a determination portion configured to determine, when a request to restart the engine is made, whether or not the reason indicated by the stop information stored in the storing portion is a reason related to locking of the work portion; and a setting portion configured to set an operation mode of the engine and the work portion to a safe mode if the determination portion determines that the reason indicated by the stop information is a reason related to locking of the work portion, wherein the safe mode is an operation mode for lessening damage to the engine and the work portion resulting from an object coming into contact with the work portion.

According to the present invention, a work machine capable of reducing damage to the work portion and the engine is provided.

DESCRIPTION OF EMBODIMENTS

Figure 1:
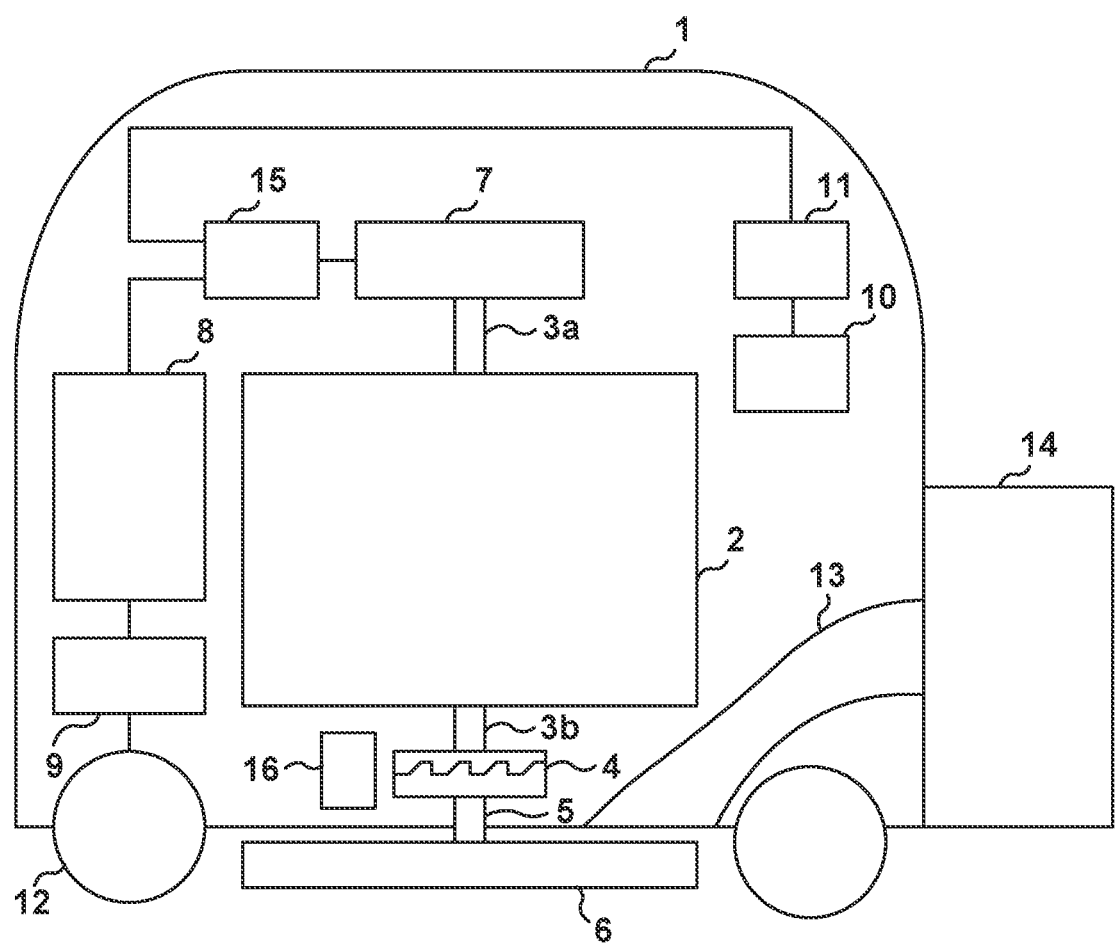
FIG. 1 is a cross-sectional view illustrating an example configuration of a work machine.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Work Machine

FIG. 1 is a cross-sectional view of a work machine according to an embodiment. Here, a lawn mower 1 is employed as an example of the work machine. The lawn mower 1 may be of any of a remote type that is remotely operated by a user, an autonomous-traveling type that does not require user operation, a walking type that is pushed from the rear of the lawn mower 1 by the user, and a ride-on type on which the user rides to operate the lawn mower 1.

The lawn mower 1 has an engine 2. The engine 2 has a crankshaft 3a that protrudes upward (rearward) from the engine 2, and a crankshaft 3b that protrudes downward (forward) from the engine 2. The crankshafts 3a and 3b are coupled or integrated with each other within the engine 2, and rotate together. The crankshaft 3b is an output shaft of the engine 2.

A clutch 4 is a clutch that is provided between the crankshaft 3b and a power shaft 5, and transmits and cuts off motive power from the crankshaft 3b to the power shaft 5. The clutch 4 may be of any type, such as an electromagnetic clutch, as long as it can be switched between a transmission state and cutoff state by a control portion 10. A blade 6 is an example of a work portion and has a cutter blade for mowing lawn grass, which is a work object. Lawn grass is mown due to the blade 6 being driven to rotate by the engine 2. The mown lawn grass is pushed out to a chute 13 by an air current (conveying wind) that is generated due to the blade 6 rotating, passes through the chute 13, and is collected in a containing portion 14.

A BSG 7 is an electric power generator-cum-motor that starts the engine 2 by driving the crankshaft 3a of the engine 2, and is driven by the started engine 2 to generate power. "BSG" is an abbreviation of a belt-starter generator. The BSG 7 transmits motive power to the crankshaft 3a via a transmission mechanism such as a belt or a gear, and receives motive power of the crankshaft 3a via the transmission mechanism. A power supply circuit 15 includes circuits (an ACDC converter, an inverter, or a DCDC converter) for converting AC voltage generated by the BSG 7 to DC voltage and charging a 48-V battery 8 and a 12-V battery 11. Thus, when the BSG 7 operates as an electric power generator, the 48-V battery 8 and the 12-V battery 11 are charged with electric power generated by this electric power generator. The 48-V battery 8 supplies electric power to a travel motor 9. The travel motor 9 drives wheels 12 to rotate. The 48-V battery 8 is an example of a battery that, when the BSG 7 operates as a motor, supplies electric power to this motor. The control portion 10 may supply electric power from the 48-V battery 8 to the BSG 7 to drive the engine 2 to start (starter function), and also assist the engine 2 after starting (torque assist function). The 12-V battery 11 supplies electric power to the control portion 10. A lifting device 16 is an adjustment portion that adjusts the ground height of the work portion. For example, the lifting device 16 may directly raise and lower the blade 6 using the motor. Alternatively, the lifting device 16 may indirectly raise and lower the blade 6 by adjusting the distance between an axle of the wheels 12 and the housing of the lawn mower 1 using the motor.

Control System

Figure 2:
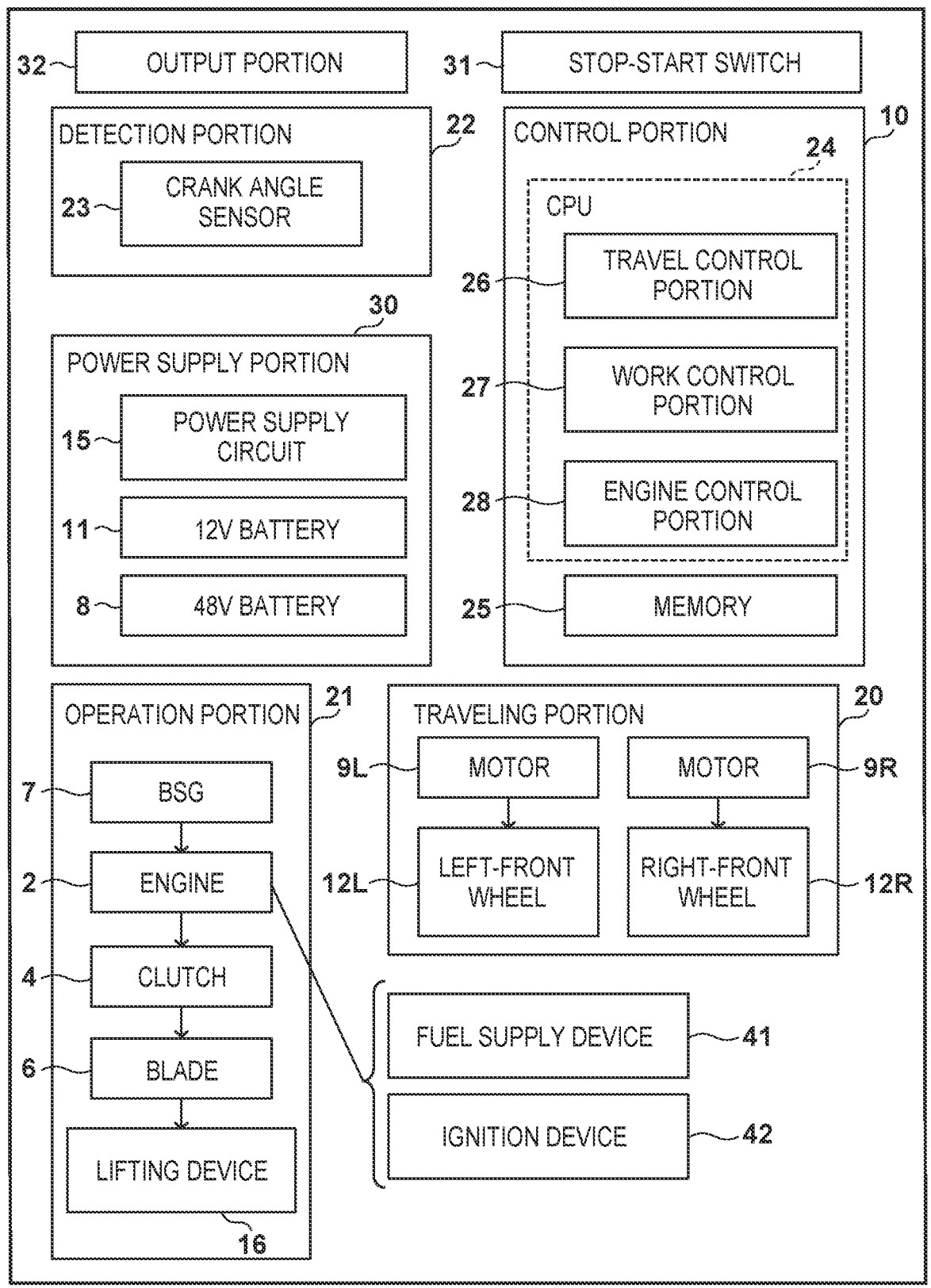
FIG. 2 is a block diagram illustrating a control system of the work machine.

FIG. 2 shows a control system of the work machine. The control portion 10 is a control circuit board that has a CPU 24 and a memory 25, which may include a RAM, a ROM, or the like. Note that the CPU 24 is a processor circuitry that may have one or more processors, and/or one or more CPU cores, ASIC (application specific integrated circuits) and/or FPGA (field programmable gate array), and/or one or more combinations of them. The ROM of the memories 25 stores a control program, for example. The CPU 24 has a travel control portion 26, a work control portion 27, and an engine control portion 28. The travel control portion 26 controls a traveling portion 20 and causes the lawn mower 1 to travel. The traveling portion 20 has a travel motor 9L that drives a wheel 12L, which is provided on a front-left side of the lawn mower 1, and a travel motor 9R that drives a wheel 12R, which is provided on a front-right side of the lawn mower 1. Note that a wheel that is provided on a rear-left side of the lawn mower 1 and a wheel that is provided on a rear-right side thereof may be driven by the travel motors 9L and 9R in place of, or together with the left-front wheel 12L and the right-front wheel 12R. The lawn mower 1 can be turned by rotating different wheels 12 respectively by the travel motors 9L and 9R. For example, if the rotational speed of the wheel 12L is lower than the rotational speed of the wheel 12R, the lawn mower 1 turns left. The lawn mower 1 also turns if the rotational direction of the wheel 12L differs from the rotational direction of the wheel 12R. The work control portion 27 controls an operation portion 21. The operation portion 21 has the BSG 7, the engine 2, the clutch 4, the blade 6, and the lifting device 16. The engine control portion 28 controls a fuel supply device 41 to supply the fuel to the engine 2 and shut off the fuel supply, and controls an ignition device 42 to ignite an air fuel mixture that is compressed in a cylinder of the engine 2.

A power supply portion 30 has the power supply circuit 15, the 12-V battery 11, and the 48-V battery 8. The voltage supplied by the 12-V battery 11 and the 48-V battery 8 is merely an example. The 12-V battery 11 and the 48-V battery 8 may be integrated into a single battery.

A detection portion 22 has a crank angle sensor 23 that detects a rotation angle (crank angle) of the crankshaft 3b of the engine 2. The engine control portion 28 detects or calculates the engine speed of the engine 2 based on a pulse signal output by the crank angle sensor 23. The crank angle sensor 23 may also be called an engine speed sensor since it can indirectly detect the engine speed of the engine 2.

The control portion 10 starts and stops the engine 2 based on the ON and OFF state of a stop-start switch 31. An output portion 32 includes at least one of an LED, a liquid crystal display device, and a sound output device, and outputs a warning or the like to a user (operator). The warning is, for example, lighting a specific LED, displaying a message, generating a specific sound, generating a specific speech, or the like. The warning is a notification for prompting the user to check if any foreign object is present, and check the work portion.

Figure 3:
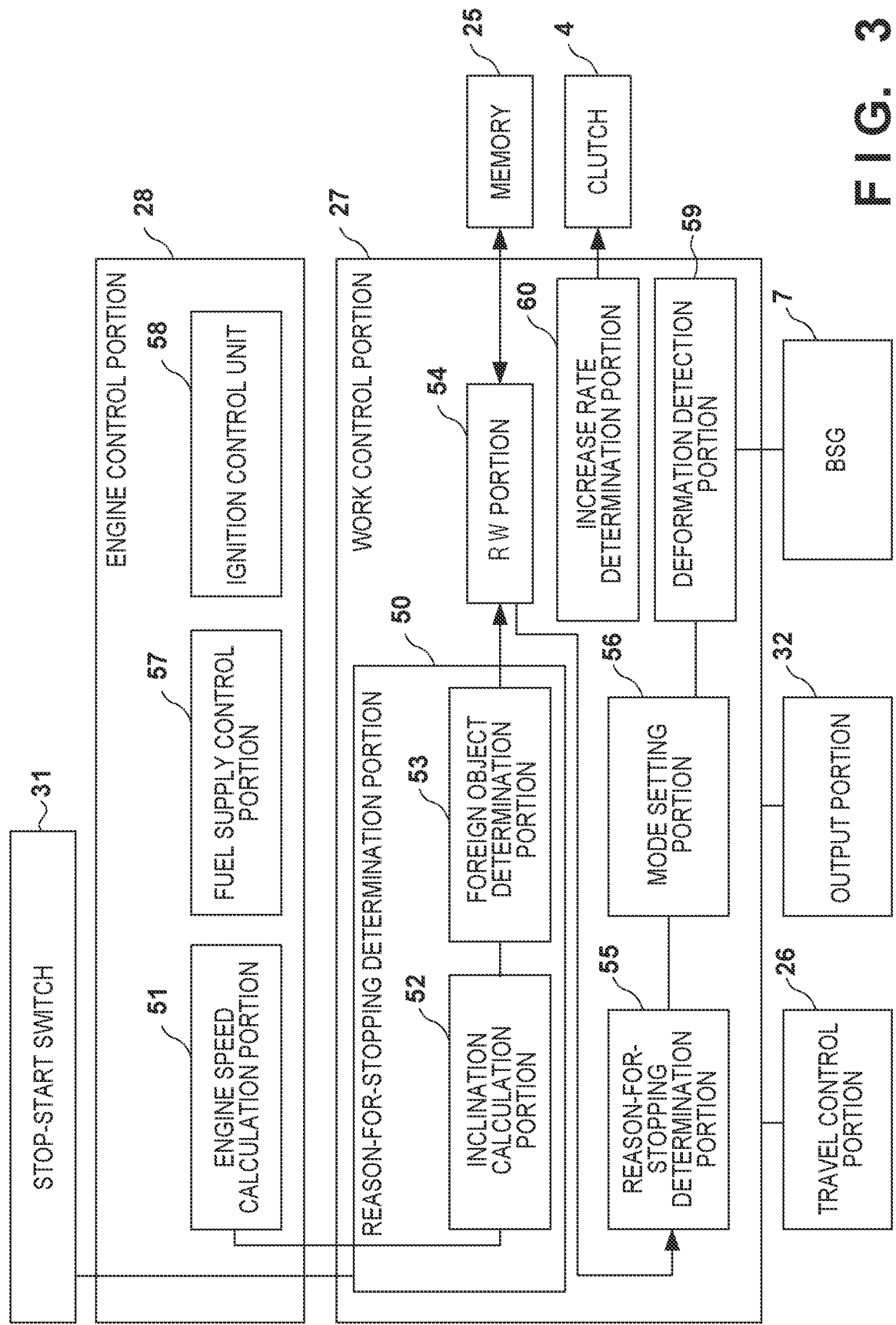
FIG. 3 is a block diagram illustrating a control system of the work machine.

FIG. 3 shows the details of the work control portion 27 and the engine control portion 28. In the engine control portion 28, an engine speed calculation portion 51 calculates the engine speed of the engine 2 based on the pulse signal output by the crank angle sensor 23. A fuel supply control portion 57 controls the ratio (air-fuel ratio) between fuel and air in an air fuel mixture at a predetermined value based on oxygen concentration detected by an O2 sensor or the like. An ignition control portion 58 controls the ignition timing of the ignition device 42 based on the pulse signal output by the crank angle sensor 23. The engine control portion 28 may adjust the target engine speed of the engine 2 by adjusting the throttle opening in the engine 2. The engine control portion 28 supports a cylinder pause mode. The cylinder pause mode is a mode of rotating the crankshafts 3a and 3b without supplying fuel to one or more combustion chambers that are provided in the engine 2. That is to say, in the cylinder pause mode, the fuel supply control portion 57 controls the fuel supply device 41 and stops the supply of the fuel to the engine 2. Similarly, the ignition control portion 58 controls the ignition device 42 and stops ignition.

In the work control portion 27, a reason-for-stopping determination portion 50 determines the reason that the engine 2 has stopped. There are several cases where the engine 2 stops. The first case is that an instruction to stop the engine 2 has been given by the user through the stop-start switch 31, and the engine control portion 28 has stopped supplying fuel to the engine 2. The second case is that the engine 2 has stopped due to a large amount of lawn grass, plant matter, an obstacle (e.g. stone, rock, dead tree, stump), or the like coming into contact with the blade 6, which is the work portion. The third case is that the engine 2 has stopped due to mowed lawn grass being stuck between the blade 6 and a housing of the lawn mower 1. If a large amount of lawn grass comes into contact with the blade 6, the engine speed of the engine 2 lowers relatively gently. If an obstacle comes into contact with the blade 6, the engine speed of the engine 2 lowers relatively rapidly. Thus, the reason-for-stopping determination portion 50 may also have an inclination calculation portion 52 and a foreign object determination portion 53. The inclination calculation portion 52 obtains the sign and the absolute value of the inclination of the engine speed obtained by the engine speed calculation portion 51. Note that the engine speed is increasing if the sign of the inclination is positive, and the engine speed is decreasing if the sign of the inclination is negative. The foreign object determination portion 53 determines whether or not the cause of locking of the work portion is a collision of a foreign object with the work portion, based on the absolute value of the inclination. For example, if the absolute value of the inclination is greater than a predetermined value, the foreign object determination portion 53 determines that the cause of locking of the work portion is a collision of a foreign object with the work portion. If the absolute value of the inclination is not greater than the predetermined value, the foreign object determination portion 53 determines that the cause of locking of the work portion is other than a collision of a foreign object. For example, if the absolute value of the inclination is not greater than the predetermined value, the foreign object determination portion 53 may determine that the cause is an excessive amount of work object (e.g. lawn grass, soil, or snow) having come into contact with the work portion. The reason-for-stopping determination portion 50 creates stop information indicating the reason for stopping, and writes the stop information in the memory 25 through a RW portion 54. The RW portion 54 is a memory interface for reading out information from the memory 25 and writing information in the memory 25.

When a request to restart the engine 2 is made by the user, a reason-for-stopping determination portion 55 reads out the stop information stored in the memory 25 through the RW portion 54. The reason-for-stopping determination portion 55 then determines whether or not the reason for stopping indicated by the stop information is a reason related to locking of the work portion. A mode setting portion 56 sets the operation mode of the engine 2 and the work portion to a safe mode if the reason for stopping is a reason related to locking of the work portion. The safe mode is an operation mode for lessening damage to the work portion and the engine 2. If the work portion comes into contact with an obstacle when the engine 2 and the work portion are operating, the engine 2 and the work portion may be damaged. If the state where the work portion is in contact with the obstacle continues, the work portion is about to stop, and soon stops. "Locking" means that the work portion is about to stop, or stops. If an obstacle comes into contact with the work portion, or an excessive amount of work object comes into contact with the work portion, the work portion is about to stop, or stops. That is to say, locking refers to a state where an excessive load is applied to the work portion and the engine 2. If the engine 2 and the work portion continue to operate when the work portion is locked, both the engine 2 and the work portion may be damaged (continuous-operation damage). Furthermore, if the engine 2 is restarted with an obstacle being in contact with the blade 6, the blade 6 may break, or parts of the engine 2 may be damaged (restart damage). Similarly, if an obstacle comes into contact with the blade 6 again after the engine 2 has been restarted, the blade 6 may break, or parts of the engine 2 may be damaged (re-contact damage). In this embodiment, the safe mode may be applied when locking of the work portion is detected, when the engine 2 is restarted immediately after locking has occurred, and after the engine 2 has been restarted. Thus, the safe mode is an operation mode for lessening damage to the engine 2 and the work portion due to an object coming into contact with the work portion. The object may be an obstacle, a work object (e.g. lawn grass, snow), or the like. Note that the user may select the safe mode before locking is detected, in a work area with many obstacles or a work area in which work object is dense. If the work portion is locked due to a dense work object, a lock-mitigation mode may be applied. In the lock-mitigation mode, the output of the engine 2 is increased. In this case, the output of the engine 2 may be increased with assistance of the BSG 7. In this lock-mitigation mode, re-locking of the work portion is suppressed.

In the safe mode, the rate of increase in the engine speed of the engine 2 driven by the BSG 7 that functions as a starter motor is lower than the increase rate in the normal mode. This may be called a slow start. In the case of a slow start, the rotational speed of the blade 6 immediately after the engine 2 has restarted is low. Thus, even if the blade 6 comes into contact with an obstacle immediately after the engine 2 has restarted, damage to the blade 6 will be small. The normal mode is an operation mode that is applied when the reason for stopping indicated by the stop information is not a reason related to locking of the work portion. This may be called a rapid start. A slow start may be realized by reducing the increase rate in the number of rotations of the BSG 7, or may be realized by suppressing the amount of fuel supplied to the engine 2. The operation efficiency in the normal mode is higher than the operation efficiency in the safe mode. This is because the rotational speed in the normal mode is greater than the rotational speed in the safe mode. Alternatively, this is because the output of the engine 2 in the normal mode is greater than the output of the engine 2 in the safe mode.

In the safe mode, the work control portion 27 may control the lifting device 16 and gradually lower the ground height of the work portion from a first ground height to a second ground height. Commonly, the higher the ground height of the blade 6 is, the greater the distance between the blade 6 and the ground or an obstacle is. That is to say, the probability decreases that the blade 6 comes into contact with an obstacle. Also, lawn grass can be gradually mowed down from the leading end of the lawn grass, and the probability will also decrease that blade locking occurs again.

In the safe mode, movement of the lawn mower 1 may be stopped by stopping the travel motor 9. Commonly, the lawn mower 1 performs predetermined work (e.g. lawn mowing, cultivation, or snow removal) while moving in a traveling direction. Accordingly, if the lawn mower 1 moves forward even after colliding with an obstacle, the blade 6 and the engine 2 are damaged. For this reason, in the safe mode, the travel control portion 26 stops the travel motor 9. Also, when blade locking occurs in an area where lawn grass is densely grown, if the lawn mower 1 has moved away from this area when restarted, lawn grass in this area is left unmowed. Accordingly, the amount of unmowed lawn grass will be reduced by the lawn mower 1 staying at the blade locking position when restarted.

In the safe mode, an increase rate determination portion 60 obtains the increase rate of the engine speed of the engine 2 acquired by the engine speed calculation portion 51. If an obstacle has not been removed from the blade 6, it is difficult to increase the number of rotations of the blade 6, and thus, the increase rate of the engine speed of the engine 2 also lowers. In such a case, the work control portion 27 switches the clutch 4 from ON to OFF. Thus, damage to the blade 6 and parts of the engine 2 will be lessened. In this case, the work control portion 27 may output, from the output portion 32, a warning for prompting the user to check the state of the work portion.

In the safe mode, the operation state of the clutch 4 may be switched to the cutoff state (OFF), the engine 2 may be set to the cylinder-pause state, the crankshafts 3a and 3b may be rotated by the BSG 7, and then the engine 2 may be started. Upon the engine speed of the engine 2 reaching a predetermined value with torque assist by the BSG 7, the work control portion 27 may switch the operation state of the clutch 4 from the cutoff state (OFF) to the transmission state (ON). Then, the work control portion 27 may also switch the BSG 7 from a torque assist mode (starter mode) to a power generation mode, with a decrease in the load applied to the engine 2 as a trigger. If the clutch 4 is switched ON when an obstacle is in contact with the blade 6, the engine speed of the engine 2 sharply decreases (overshoot). If the clutch 4 is switched ON when a large amount of lawn grass is in contact with the blade 6, the engine speed of the engine 2 decreases similarly. Thus, upon the engine speed of the engine 2 reaching a predetermined value, the work control portion 27 switches ON the clutch 4. Also, the BSG 7 may continue torque assist for the engine 2 even after the clutch 4 has turned ON. Thus, even a large amount of lawn grass can be mowed.

A deformation detection portion 59 detects deformation of the work portion (blade 6) based on the amount of change in the output voltage of the BSG 7. If the blade 6 comes into contact with an obstacle and is deformed, the blade 6 rotates while vibrating. This vibration is transmitted to the BSG 7 through the crankshafts 3a and 3b of the engine 2. If this vibration is transmitted when the BSG 7 is functioning as an electric power generator, the output voltage of the BSG 7 also varies. If the deformation detection portion 59 detects deformation of the work portion (blade 6) based on the amount of change in the output voltage of the BSG 7, at least one of the engine 2 and the work portion may be stopped. The engine 2 is stopped by stopping the supply of fuel to the engine 2. If the clutch 4 turns OFF, the rotation of the blade 6 stops. In this case, the output portion 32 may output the aforementioned warning. Thus, the user will be able to recognize the deformation of the blade 6 and replace it.

Flowchart

Figure 4:
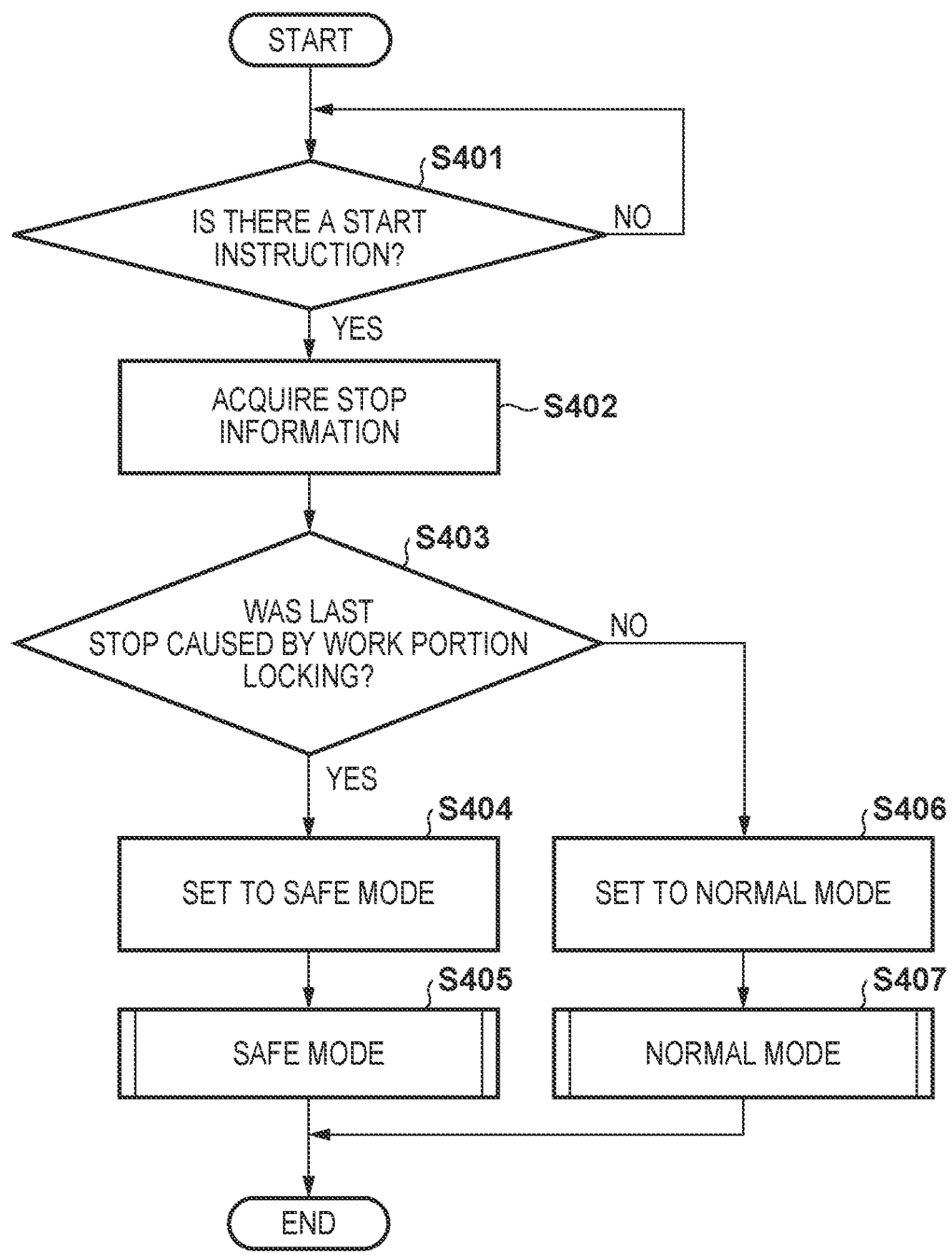
FIG. 4 is a flowchart showing a method for controlling the work machine.

FIG. 4 shows a control method performed by the CPU 24 in accordance with the control program.

In step S401, the CPU 24 (engine control portion 28) determines whether or not an instruction to start the engine 2 has been given by the user. If the user has operated the stop-start switch 31 and given an instruction to start the engine 2, the CPU 24 advances the processing to step S402. An instruction to start the engine 2 given immediately after blade locking has occurred may also be called a restart request.

In step S402, the CPU 24 (reason-for-stopping determination portion 55) acquires stop information from the memory 25.

In step S403, the CPU 24 (reason-for-stopping determination portion 55) specifies the reason that the engine 2 stopped last time, based on the stop information, and determines whether or not the specified reason for the stop is locking of the work portion. If the reason for the stop is locking of the work portion, the CPU 24 advances the processing to step S404. If the reason for the stop is not locking of the work portion, the CPU 24 advances the processing to step S406.

In step S404, the CPU 24 (mode setting portion 56) sets the operation mode of the lawn mower 1 to the safe mode. In step S405, the CPU 24 (work control portion 27) causes the lawn mower 1 to perform work in the safe mode.

In step S406, the CPU 24 (mode setting portion 56) sets the operation mode of the lawn mower 1 to the normal mode. In step S407, the CPU 24 (work control portion 27) causes the lawn mower 1 to perform work in the normal mode.

Safe Mode

Figure 5:
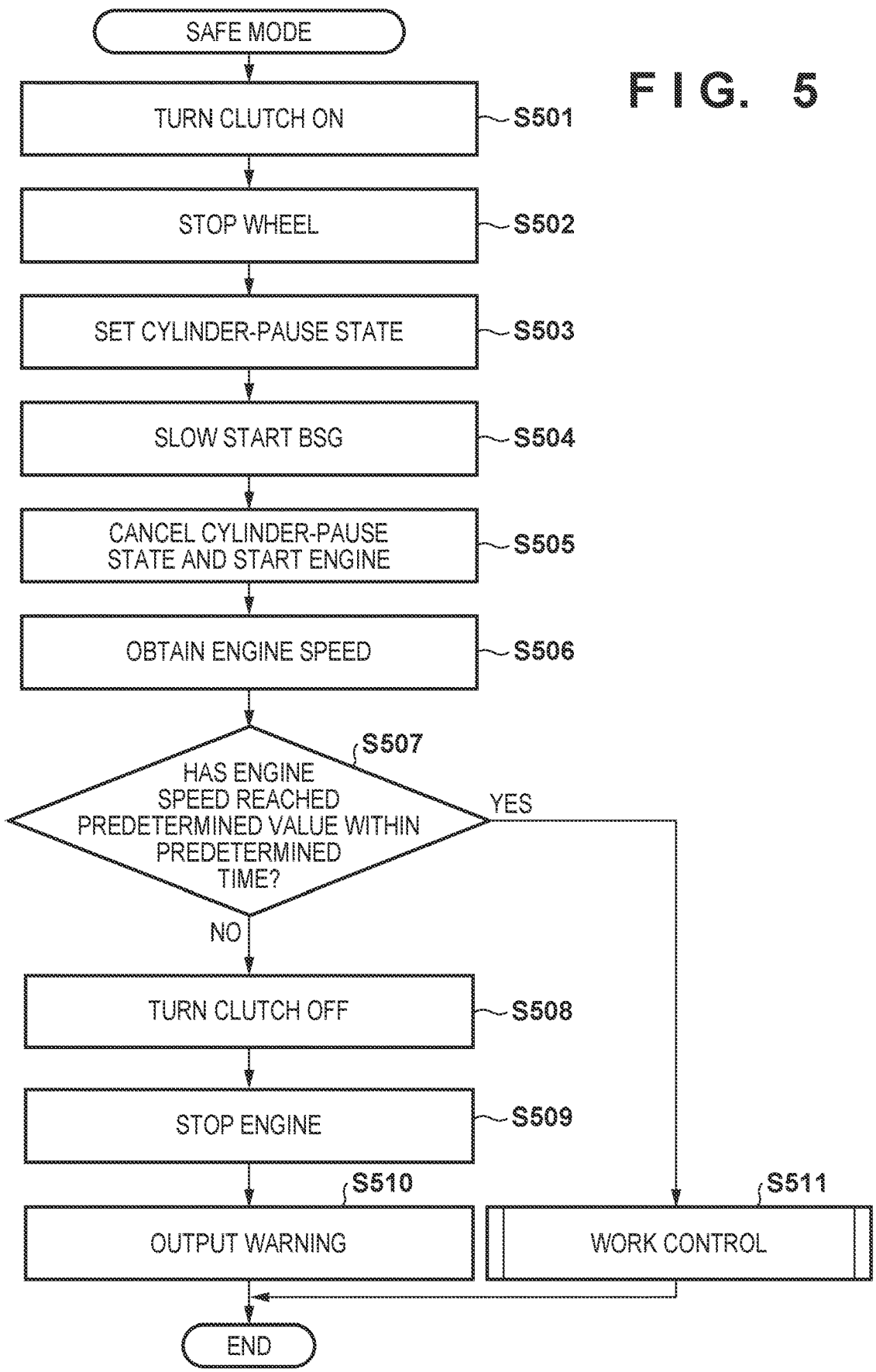
FIG. 5 is a flowchart showing a safe mode.

FIG. 5 shows the safe mode that is executed by the CPU 24 in accordance with the control program.

In step S501, the CPU 24 (work control portion 27) turns on (transmission state) the clutch 4.

In step S502, the CPU 24 (travel control portion 26) keeps the travel motor 9 in the stop state, thereby not rotating the wheels 12 such that the lawn mower 1 does not move. Note that, if the cause of blade locking is the presence of an obstacle, the travel control portion 26 may drive the travel motor 9 and reverse the lawn mower 1. If the cause of blade locking is the presence of a large amount of lawn grass, the travel control portion 26 may cause the lawn mower 1 to stay in the current spot by not driving the travel motor 9. The cause of the stop may be included in the stop information.

In step S503, the CPU 24 (engine control portion 28) sets the engine 2 to the cylinder-pause state.

In step S504, the CPU 24 (work control portion 27) slow-starts the BSG 7. That is to say, the work control portion 27 operates the BSG 7 as a starter motor, and sets the increase rate of the number of rotations of the BSG 7 to the increase rate in the normal mode. Upon the number of rotations of the crankshafts 3a and 3b of the engine 2 thus reaching a predetermined value, the CPU 24 advances the processing to step S505.

In step S505, the CPU 24 (engine control portion 28) cancels the cylinder-pause state and starts the engine 2. For example, the fuel supply control portion 57 controls the fuel supply device 41 and starts supplying fuel to the engine 2. Also, the ignition control portion 58 causes the ignition device 42 to perform ignition in accordance with the ignition timing.

In step S506, the CPU 24 (engine speed calculation portion 51) obtains the engine speed of the engine 2 based on the pulse signal output by the crank angle sensor 23.

In step S507, the CPU 24 (engine speed calculation portion 51) determines whether or not the engine speed of the engine 2 has reached a predetermined value in a predetermined time. At this time, the crankshafts 3a and 3b of the engine 2 are coupled to the blade 6 via the clutch 4. Accordingly, if an obstacle (foreign object), a large amount of lawn grass, or the like is still acting on the blade 6, the increase rate of the engine speed is small. That is to say, the engine speed does not reach the predetermined value in the predetermined time. On the other hand, an obstacle, a large amount of lawn grass, or the like is no longer acting on the blade 6, the increase rate of the engine speed is large. That is to say, the engine speed reaches the predetermined value in the predetermined time. Thus, the CPU 24 can determine whether or not the factor of locking of the blade 6 has been solved or reduced, based on the engine speed. Note that the predetermined time is a threshold related to the time that has elapsed since the engine began to start. If the engine speed has reached the predetermined value in the predetermined time, the CPU 24 advances the processing to step S511. Step S511 is a step related to work control, and the details thereof will be described later. On the other hand, if the engine speed does not reach the predetermined value in the predetermined time, the CPU 24 advances the processing to step S508.

In step S508, the CPU 24 (work control portion 27) turns OFF (cutoff state) the clutch 4.

In step S509, the CPU 24 (engine control portion 28) stops the engine 2. For example, the fuel supply control portion 57 controls the fuel supply device 41 and stops supplying fuel to the engine 2. Also, the ignition control portion 58 causes the ignition device 42 to stop ignition.

In step S510, the CPU 24 (work control portion 27) outputs a warning to the output portion 32. This warning is for prompting the user to check the state of the blade 6. The use will remove an obstacle or the like from the blade 6 in accordance with the warning.

Figure 6:
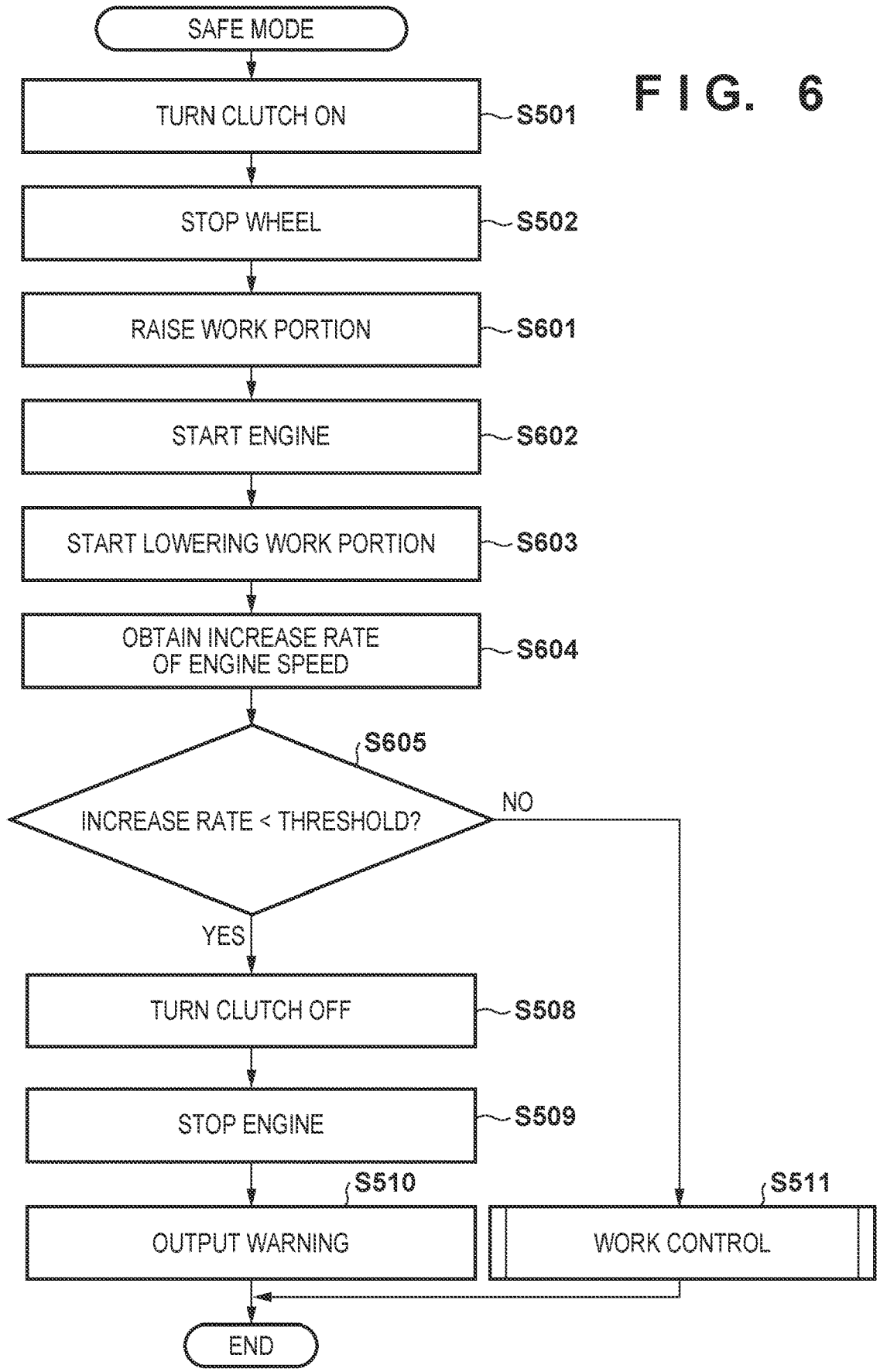
FIG. 6 is a flowchart showing a safe mode.

FIG. 6 shows another safe mode that is executed by the CPU 24 in accordance with the control program. Of the steps shown in FIG. 6, the same steps as those in FIG. 5 are not described.

In step S601, the CPU 24 (work control portion 27) controls the lifting device 16 to raise the work portion. Thus, the blade 6 is raised to the first ground height h1. The ground height of the blade 6 may be variable between the first ground height h1 and the second ground height h2 (h1>h2), for example. The lawn mower 1 can change the height of lawn grass by changing the ground height of the blade 6. If the ground height of the blade 6 reaches the first ground height h1, there is a possibility that the distance between the blade 6 and an obstacle increases. Accordingly, damage to the blade 6 will be lessened. Upon the ground height of the blade 6 reaching h, the CPU 24 advances the processing to step S602. Note that the first ground height h1 may be a position at which the blade 6 starts mowing down, and the second ground height h2 may be a target position.

In step S602, the CPU 24 (engine control portion 28) starts the engine 2. Thus, the blade 6 starts to rotate.

In step S603, the CPU 24 (work control portion 27) controls the lifting device 16 to lower the work portion. Thus, the blade 6 starts lowering toward the second ground height h2. The second ground height h2 may be a ground height determined by the user, for example. The user may set the second ground height h2 in order to adjust the height of lawn grass.

In step S604, the CPU 24 (engine speed calculation portion 51, increase rate determination portion 60) determines the increase rate of the engine speed of the engine 2. The influence of lawn grass, an obstacle, or the like that acts on the blade 6 is reflected by the increase rate of the engine speed.

In step S605, the CPU 24 (increase rate determination portion 60) determines whether or not the increase rate is smaller than a threshold. The threshold is a value that is set in advance to detect a situation in which the blade 6 is to be stopped. If the increase rate is greater than or equal to the threshold, the factor of locking of the blade 6 has been solved or reduced. Thus, the CPU 24 (increase rate determination portion 60) advances the processing to step S511. On the other hand, if the increase rate is smaller than the threshold, the factor of locking of the blade 6 has not been solved. Thus, the CPU 24 advances the processing to step S508.

Normal Mode

Figure 7:
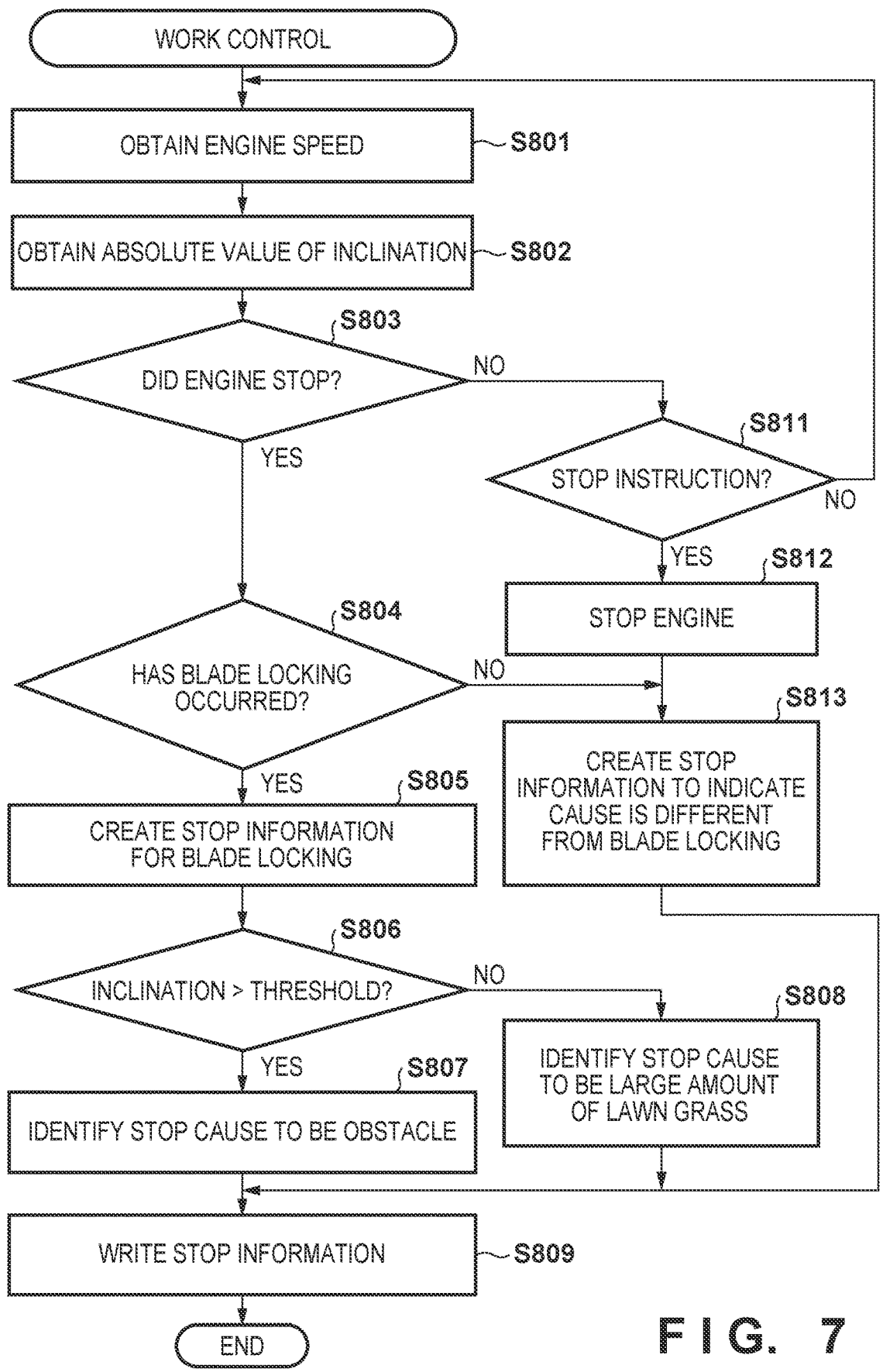
FIG. 7 is a flowchart showing a normal mode.

FIG. 7 shows the normal mode that is executed by the CPU 24 in accordance with the control program. Here, it is assumed that the clutch 4 is OFF.

In step S701, the CPU 24 (engine control portion 28) starts the engine 2. The engine control portion 28 causes the BSG 7 to function as a starter motor, and rotates the crankshafts 3a and 3b of the engine 2. The fuel supply control portion 57 controls the fuel supply device 41 and starts supplying fuel to the engine 2. Also, the ignition control portion 58 causes the ignition device 42 to perform ignition in accordance with the ignition timing.

In step S702, the CPU 24 (engine speed calculation portion 51) obtains the engine speed of the engine 2.

In step S703, the CPU 24 (work control portion 27) determines whether or not the engine speed has reached a work engine speed. The work engine speed refers to the engine speed of the engine 2 when lawn grass is mowed. If the engine speed reaches the work engine speed, the CPU 24 advances the processing to step S704.

In step S704, the CPU 24 (work control portion 27) turns ON the clutch 4. Then, the CPU 24 advances the processing to step S511, and performs work control.

Work Control

Figure 8:
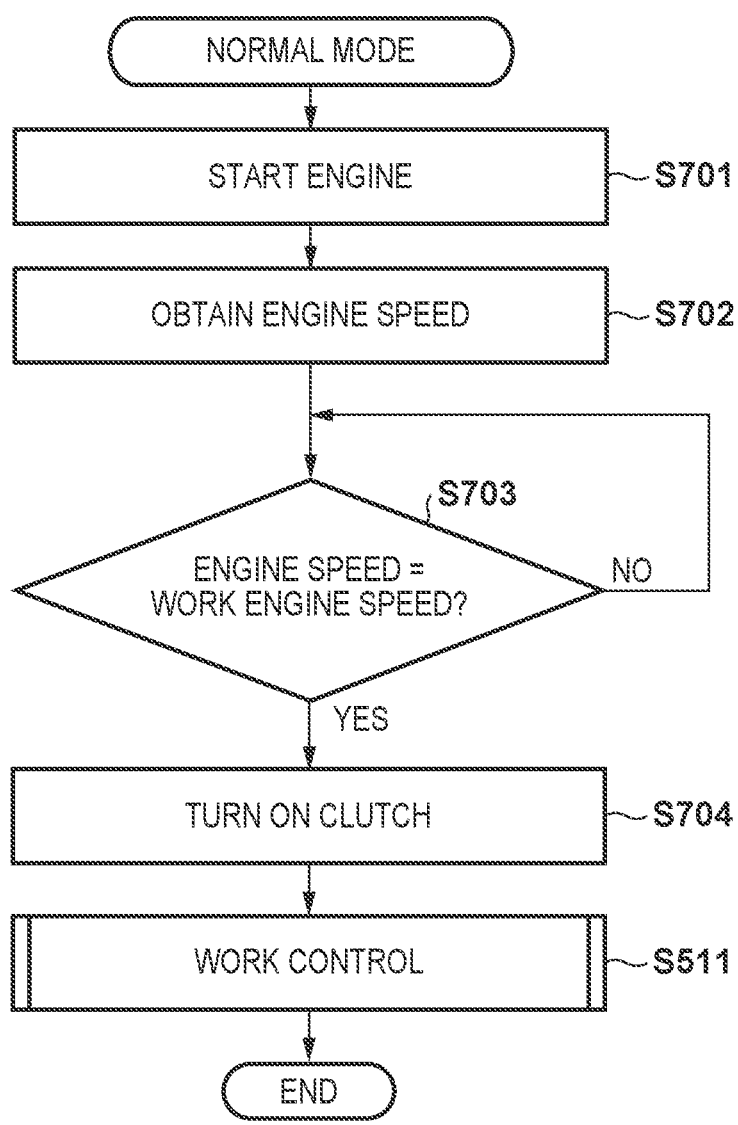
FIG. 8 is a flowchart showing the details of work control.

FIG. 8 shows work control that is performed by the CPU 24 in accordance with the control program.

In step S801, the CPU 24 (engine speed calculation portion 51) obtains the engine speed of the engine 2.

In step S802, the CPU 24 (inclination calculation portion 52) obtains the absolute value of the inclination of the engine speed of the engine 2. Note that the engine speed is obtained in accordance with a fixed sampling period, and the sign of the inclination and the absolute value of the inclination are obtained based on a sampling value that is a predetermined number.

In step S803, the CPU 24 (reason-for-stopping determination portion 50) determines whether or not the engine 2 has stopped. For example, if the crank angle sensor 23 no longer outputs the pulse signal, or the output voltage of the BSG 7 is 0 V, the CPU 24 determines that the engine 2 has stopped. If the engine 2 has not stopped, the CPU 24 advances the processing to step S811.

Factor of Stop Other than Blade Locking

In step S811, the CPU 24 (engine control portion 28) determines whether or not an instruction to stop the engine 2 has been given through the stop-start switch 31. If the CPU 24 has not accepted a stop instruction, the CPU 24 returns the processing to step S801. If the CPU 24 has accepted a stop instruction, the CPU 24 advances the processing to step S812. In step S812, the CPU 24 (engine control portion 28) stops the engine 2. In step S813, the CPU 24 (reason-for-stopping determination portion 50) creates stop information indicating that the factor of the stop is other than blade locking. For example, the stop information includes information indicating that the engine 2 has stopped based on a stop request made by the user. In step S809, the CPU 24 (RW portion 54) writes the stop information in the memory 25.

Factor of Stop Resulting from Blade Locking

If it is determined in step S803 that the engine 2 has stopped, the CPU 24 advances the processing to step S804.

In step S804, the CPU 24 (reason-for-stopping determination portion 50) determines whether or not blade locking has occurred, based on the inclination of the engine speed. If the absolute value of the inclination exceeds a threshold, the reason-for-stopping determination portion 50 determines that blade locking has occurred. Furthermore, the foreign object determination portion 53 may determine, based on the absolute value of the inclination, whether or not the cause of blade locking is a collision of a foreign object with the blade 6. If blade locking has not occurred, the CPU 24 advances the processing to step S813. In step S813, the reason-for-stopping determination portion 50 creates stop information indicating that the engine 2 has stopped due to a factor other than blade locking.

In step S805, the CPU 24 (reason-for-stopping determination portion 50) creates stop information related to blade locking. The reason-for-stopping determination portion 50 creates stop information indicating that the engine 2 has stopped due to blade locking. The reason-for-stopping determination portion 50 may also include the result of determination by the foreign object determination portion 53 in the stop information. If the absolute value of the inclination exceeds a threshold, the foreign object determination portion 53 determines that the cause of blade locking is a collision of a foreign object with the blade 6. If the absolute value of the inclination does not exceed the threshold, the foreign object determination portion 53 determines that the cause of blade locking is other than a collision of a foreign object. A cause other than a collision of a foreign object may be a large amount of lawn grass or plant twining around the blade 6 and inhibiting rotation of the blade 6.

In step S806, the CPU 24 (foreign object determination portion 53) determines whether or not the absolute value of the inclination exceeds a threshold. That is to say, the foreign object determination portion 53 determines whether the cause of the stop of the engine 2 (the cause of blade locking) lies in the presence of an obstacle or the presence of a large amount of work object. If the absolute value of the inclination exceeds the threshold, the CPU 24 advances the processing to step S807. If the absolute value of the inclination does not exceed the threshold, the CPU 24 advances the processing to step S808. The threshold is determined by conducting a test, a simulation, or the like in advance, so as to be able to distinguish between an obstacle and a large amount of work object.

In step S807, the CPU 24 (foreign object determination portion 53) specifies an obstacle as the cause of the stop, and includes the cause of the stop in the stop information.

In step S808, the CPU 24 (foreign object determination portion 53) specifies a large amount of lawn grass as the cause of the stop, and includes the cause of the stop in the stop information.

In step S809, the CPU 24 (RW portion 54) writes the stop information created by the reason-for-stopping determination portion 50 in the memory 25.

Summary

According to a first aspect, a work machine (e.g. the lawn mower 1, a snow blower, or a cultivator) is provided that has the engine 2, the work portion (e.g. the blade 6, an auger, a rotary) driven by the engine 2, and the control portion 10 for controlling the engine 2. The memory 25 is an example of a storing portion for storing, when the engine 2 stops, stop information indicating a reason for the stop. The reason-for-stopping determination portion 55 is an example of a determination portion for determining, when a request to restart the engine 2 is made, whether or not the reason indicated by the stop information stored in the storing portion is a reason related to locking of the work portion. The mode setting portion 56 is an example of a setting portion for setting the operation mode of the engine 2 and the work portion to the safe mode if the reason indicated by the stop information is a reason related to locking of the work portion. Here, the safe mode is an operation mode for lessening damage to the engine and the work portion resulting from an object coming into contact with the work portion. By thus employing the safe mode, damage to the work portion and parts of the engine 2 accompanying a restart of the engine 2 is lessened.

According to a second aspect, the BSG 7 is an example of a starter motor for driving the output shaft of the engine 2. The control unit 10 may be configured to, when in the safe mode, set the engine 2 to the cylinder-pause state, and drive the output shaft of the engine 2 using a starter motor. Note that the increase rate of the number of rotations of the starter motor in the safe mode is lower than the increase rate of the number of rotations of the starter motor in the normal mode. The normal mode is an operation mode that is applied when the reason indicated by the stop information is not a reason related to locking of the work portion. By thus moderately increasing the number of rotations of the crankshafts 3*a* and 3*b* using the BSG 7, damage to the work portion and the engine 2 accompanying a restart is lessened.

According to a third aspect, the lifting device 16 is an example of an adjustment portion for adjusting the ground height of the work portion. When in the safe mode, the control unit 10 may control the adjustment portion and gradually lower the ground height of the work portion from the first ground height to the second ground height. The leading end of lawn grass is thin, and the root of lawn grass is thick. Accordingly, if blade locking occurs in an area where lawn grass is dense, the blade 6 mows lawn grass from the leading end thereof gradually toward the root. Thus, the load applied to the blade 6 is lessened, and therefore, blade locking is unlikely to occur again.

According to a fourth aspect, each of the wheels 12 is an example of a drive wheel. The travel motor 9 is an example of a drive wheel motor for rotating the drive wheel. When in the safe mode, the control unit 10 may stop the drive wheel motor. There may be cases where the lifting device 16 raises the blade 6 due to an occurrence of blade locking in a certain area. If, when the engine 2 is restarted, the lawn mower 1 has moved from the position where blade locking occurred, lawn grass in this area will be left unmowed. Accordingly, if blade locking occurs, the lawn mower 1 is kept staying in the current spot, thereby reducing unmowed lawn grass. Note that the control unit 10 may determine whether the cause of blade locking lies in a collision of a foreign object or dense lawn grass, based on the inclination of the engine speed. If a collision of a foreign object is the cause of blade locking, the control portion 10 may move the lawn mower 1. If dense lawn grass is the cause of blade locking, the control portion 10 may keep the lawn mower 1 staying in the current spot.

According to a fifth aspect, the clutch 4 is an example of a clutch that is provided between the output shaft of the engine 2 and the power shaft of the work portion, and transmits and cuts off motive power from the output shaft of the engine 2 to the power shaft. The crank angle sensor 23 is an example of a sensor for detecting the engine speed of the engine 2. If the increase rate of the engine speed of the engine 2 detected by the sensor when in the safe mode is smaller than a threshold, the control unit 10 switches the clutch 4 from the transmission state to the cutoff state. If the increase rate is smaller than the threshold, there is a possibility that the cause of blade locking has not been solved. Accordingly, the clutch 4 may be turned OFF to lessen damage to the blade 6 and parts of the engine 2.

According to a sixth embodiment, the fuel supply device 41 is an example of a supply portion for supplying fuel to the engine 2. The ignition device 42 is an example of an ignition device that is provided in the engine 2. There are cases where the reason-for-stopping determination portion 55 determines that the reason indicated by the stop information is not a reason related to locking of the work portion. In this case, when in the safe mode, the control portion 10 may set the engine 2 to the cylinder-pause state, and start driving the output shaft of the engine 2 using the BSG 7. Upon the engine speed of the engine 2 detected by the sensor reaching a first value, the control portion 10 may start supplying fuel to the engine 2 using the supply portion, and cause the ignition device 42 to start ignition. Thus, the engine 2 starts. Furthermore, upon the engine speed of the engine 2 detected by the sensor reaching a second value, the control portion 10 may switch the clutch 4 from the cutoff state to the transmission state. The second value is greater than the first value. The first value is a value that allows the engine 2 to rotate independently. The second value is a value suitable for the work portion to operate. The engine speed is stabilized by thus assisting the engine 2 using the BSG 7. Furthermore, a decrease in the engine speed of the engine 2 can be reduced by coupling the engine 2 with the work portion via the clutch 4 in a period in which the BSG 7 is assisting the engine 2. Note that the BSG 7 transitions from the assist mode to the power generation mode after the clutch 4 had turned ON.

According to a seventh aspect, the output portion 32 is an example of an output portion for outputting a warning for prompting an operator to check the state of the work portion when in the safe mode. Thus, the user will be able to investigate the cause of blade locking and solve it.

According to an eighth aspect, the BSG 7 is an example of an electric power generator driven by the engine 2 to generate electric power. The inclination calculation portion 52 is an example of an inclination calculation portion for acquiring the absolute value of the inclination of the engine speed of the engine 2 when the engine speed of the engine 2 decreases. The foreign object determination portion 53 is an example of a judging portion for determining, based on the absolute value of the inclination, whether or not the cause of locking of the work portion is a collision of a foreign object with the work portion. The RW portion 54 is an example of a writing portion for writing, in the storing portion, stop information indicating that the cause of locking of the work portion is a collision of a foreign object with the work portion. The stop information may thus include the reason for stopping and the cause of stopping. There are cases where the reason for stopping included in the stop information is a reason related to locking of the work portion, and the cause of stopping included in the stop information is a collision of a foreign object with the work portion. In such cases, the deformation detection portion 59 may function as a detection portion for detecting deformation of the work portion based on the amount of change in the output voltage of the electric power generator when in the safe mode. If deformation of the work portion is detected by the detection portion, the control portion 10 stops at least one of the engine 2 and the work portion. Thus, further damage to the work portion and the engine 2 accompanying the deformation of the work portion can be suppressed. The control portion 10 may output, to the output portion 32, a warning for prompting the user to check the work portion.

According to a ninth aspect, the stop-start switch 31 is an example of an accepting portion for accepting an instruction to stop the engine 2. When the engine 2 stops based on an instruction to stop the engine 2, the RW portion 54 writes, in the storing portion, stop information indicating that the engine 2 has stopped based on the instruction to stop the engine 2. When the engine 2 stops without an instruction to stop the engine 2, the RW portion 54 writes, in the storing portion, stop information indicating that the engine 2 has stopped based on locking of the work portion. Thus, the reason for the stop and the cause of the stop of the engine 2 can be used when a request to restart is made.

According to a tenth aspect, if the cause of locking of the work portion is a dense work object (e.g. entering a lawn grass field with highly dense lawn grass etc.), the control portion may increase the output of the engine 2 to a level higher than the output of the engine 2 before the locking of the work portion occurred. Thus, locking of the engine 2 and the work portion will be suppressed. This mode may also be called a lock-mitigation mode. The output of the engine 2 may be assisted by the BSG 7.

According to an eleventh aspect, the starter motor may be an electric power generator-cum-motor, such as the BSG 7.

According to a twelfth aspect, a work machine according to an eighth aspect wherein the electric power generator is an electric power generator-cum-motor, such as the BSG 7.

According to a thirteenth aspect, the work portion may be the blade 6 for mowing lawn grass. That is to say, the work machine may be the lawn mower 1.

According to a fourteenth aspect, the work portion may be a rotary for cultivating soil. That is to say, the work machine may be a cultivator.

According to a fifteenth aspect, the work portion may be an auger for raking out snow. That is to say, the work machine may be a snow blower.

The invention claimed is:
1. A work machine comprising:
an engine;
a starter motor configured to drive an output shaft of the engine;
a rotary driven by the engine; and
a processor circuitry configured to control the engine; and
a memory configured to store, when the engine has stopped, stop reason information indicating a reason why the engine has stopped, wherein the processor circuitry is further configured to:
determine, when a request to restart the engine is made, whether or not the stop reason information stored in the memory indicates that the engine has stopped due to locking of the rotary; and
set an operation mode of the engine and the rotary to a safe mode if the processor circuitry determines that the stop reason information indicates that the engine has stopped due to locking of the rotary,
wherein the safe mode is an operation mode for lessening damage to the engine and the rotary resulting from an object coming into contact with the rotary, and
wherein the processor circuitry is configured to, when in the safe mode, set the engine to a cylinder-pause state, and drive the output shaft using the starter motor,
an increase rate of the number of rotations of the starter motor in the safe mode is lower than an increase rate of the number of rotations of the starter motor in a normal mode, and
the normal mode is an operation mode that is applied when the stop reason information indicates that the engine has stopped due to a reason other than locking of the rotary.

2. The work machine according to claim 1, further comprising
a height adjuster configured to adjust a ground height of the rotary,
wherein, when in the safe mode, the processor circuitry controls the height adjuster and gradually lowers the ground height of the rotary from a first ground height to a second ground height.

3. The work machine according to claim 1, further comprising:
a drive wheel; and
a drive wheel motor configured to rotate the drive wheel,
wherein, when in the safe mode, the processor circuitry stops the drive wheel motor.

4. The work machine according to claim 1, further comprising:
a clutch configured to transmit and cut off motive power from the output shaft of the engine to a power shaft of the rotary, the clutch being provided between the output shaft of the engine and the power shaft; and
a sensor configured to detect an engine speed of the engine,
wherein if, when in the safe mode, the increase rate of the engine speed of the engine detected by the sensor is smaller than a threshold, the processor circuitry switches the clutch from a transmission state to a cutoff state.

5. The work machine according to claim 1, further comprising at least one of an LED, a liquid crystal display device, and a sound output device, wherein the at least one of the LED, the liquid crystal display device, and the sound output device is configured to output a warning for prompting an operator to check a state of the rotary when in the safe mode.

6. The work machine according to claim 1, wherein the processor circuitry is further configured to: accept an instruction to stop the engine; and write, in the memory, the stop reason information indicating that the engine has stopped based on the instruction to stop the engine, when the engine has stopped based on the instruction to stop the engine, and write, in the memory, the stop reason information indicating that the engine has stopped based on locking of the rotary when the engine has stopped without the instruction to stop the engine.

7. The work machine according to claim 1, wherein if a cause of locking of the rotary is that a density of work objects is higher than a predetermined density, the processor circuitry increases output of the engine to make the output of the engine greater than that before locking of the rotary occurred.

8. The work machine according to claim 1, wherein the starter motor is an electric power generator-cum-motor.

9. The work machine according to claim 1, wherein the rotary is a blade for mowing lawn grass.

10. The work machine according to claim 1, wherein the rotary is a rotary for cultivating soil.

11. The work machine according to claim 1, wherein the rotary is an auger for raking out snow.

12. A work machine comprising:
an engine;
a rotary driven by the engine; and
a clutch configured to transmit and cut off motive power from an output shaft of the engine to a power shaft of the rotary, the clutch being provided between the output shaft of the engine and the power shaft;
a sensor configured to detect an engine speed of the engine;
a starter motor configured to drive the output shaft of the engine;
a fuel supply configured to supplying fuel to the engine; and
an ignition device provided in the engine,
a processor circuitry configured to control the engine; and
a memory configured to store, when the engine has stopped, stop reason information indicating a reason why the engine has stopped, wherein the processor circuitry is further configured to:
  determine, when a request to restart the engine is made, whether or not the stop reason information stored in the memory indicates that the engine has stopped due to locking of the rotary; and
  set an operation mode of the engine and the rotary to a safe mode if the processor circuitry determines that the stop reason information indicates that the engine has stopped due to locking of the rotary,
wherein the safe mode is an operation mode for lessening damage to the engine and the rotary resulting from an object coming into contact with the rotary, and
wherein the processor circuitry sets, when in the safe mode, the engine to a cylinder-pause state, starts driving the output shaft using the starter motor, starts supplying fuel to the engine using the fuel supply and causes the ignition device to start ignition upon the engine speed of the engine detected by the sensor reaching a first value, and switches the clutch from a cutoff state to a transmission state upon the engine speed of the engine detected by the sensor reaching a second value.

13. A work machine comprising:
an engine;
an electric power generator driven by the engine to generate electric power;
a rotary driven by the engine; and
a processor circuitry configured to control the engine; and
a memory configured to store, when the engine has stopped, stop reason information indicating a reason why the engine has stopped, wherein the processor circuitry is further configured to:
  determine, when a request to restart the engine is made, whether or not the stop reason information stored in the memory indicates that the engine has stopped due to locking of the rotary; and
  set an operation mode of the engine and the rotary to a safe mode if the processor circuitry determines that the stop reason information indicates that the engine has stopped due to locking of the rotary,
wherein the safe mode is an operation mode for lessening damage to the engine and the rotary resulting from an object coming into contact with the rotary,
wherein the processor circuitry is further configured to:
  acquire an absolute value of an inclination of an engine speed of the engine when the engine speed of the engine lowers;
  judge, based on the absolute value of the inclination, whether or not a cause of locking of the rotary is a collision of a foreign object with the rotary;
  write, in the memory, the stop reason information indicating that the cause of locking of the rotary is a collision of a foreign object with the rotary; and
  detect deformation of the rotary based on an amount of change in an output voltage of the electric power generator in the safe mode if the stop reason information indicates that the engine has stopped due to locking of the rotary, and the cause of locking of the rotary is a collision of a foreign object with the rotary,
wherein if deformation of the rotary is detected the processor circuitry stops at least one of the engine and the rotary.

14. The work machine according to claim 13, wherein the electric power generator is an electric power generator-cum-motor.

* * * * *